United States Patent
Kondo et al.

(10) Patent No.: US 9,496,558 B2
(45) Date of Patent: *Nov. 15, 2016

(54) NONAQUEOUS ELECTROLYTE AIR BATTERY

(71) Applicant: Kabushiki Kaisha Toshiba, Minato-ku (JP)

(72) Inventors: Asato Kondo, Kanagawa (JP); Takashi Kuboki, Tokyo (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 577 days.

This patent is subject to a terminal disclaimer.

(21) Appl. No.: 14/208,665

(22) Filed: Mar. 13, 2014

(65) Prior Publication Data

US 2014/0295291 A1  Oct. 2, 2014

(30) Foreign Application Priority Data

Mar. 26, 2013 (JP) ................. 2013-064795
Mar. 12, 2014 (JP) ................. 2014-049515

(51) Int. Cl.
*H01M 8/22* (2006.01)
*H01M 4/86* (2006.01)
*H01M 12/08* (2006.01)

(52) U.S. Cl.
CPC ........... *H01M 4/8668* (2013.01); *H01M 12/08* (2013.01); *Y02E 60/50* (2013.01)

(58) Field of Classification Search
CPC .. H01M 4/8668; H01M 12/08; H01M 12/04; H01M 12/06; Y02E 60/50
See application file for complete search history.

(56) References Cited

U.S. PATENT DOCUMENTS

| 7,147,967 | B1 | 12/2006 | Read | |
|---|---|---|---|---|
| 2012/0321968 | A1* | 12/2012 | Sato | H01M 12/06 429/403 |
| 2013/0011750 | A1* | 1/2013 | Kim | H01M 12/08 429/405 |
| 2013/0029233 | A1 | 1/2013 | Lee et al. | |
| 2013/0260265 | A1* | 10/2013 | Shimizu | H01M 12/08 429/405 |
| 2014/0295299 | A1* | 10/2014 | Kondo | H01M 4/8668 429/407 |

FOREIGN PATENT DOCUMENTS

| JP | 3515492 | 4/2004 |
|---|---|---|
| JP | 2005-116317 | 4/2005 |
| JP | 4015916 | 11/2007 |
| JP | 4223705 | 2/2009 |
| WO | WO 2013/145109 A1 | 10/2013 |
| WO | WO 2013/145110 A1 | 10/2013 |

OTHER PUBLICATIONS

J. Read, "Characterization of the Lithium/Oxygen Organic Electrolyte Battery", Journal of the Electrochemical Society, 149 (9), 2002, 6 pages.

(Continued)

*Primary Examiner* — Raymond Alejandro
(74) *Attorney, Agent, or Firm* — Oblon, McClelland, Maier & Neustadt, L.L.P.

(57) ABSTRACT

A nonaqueous electrolyte air battery has s positive electrode comprises at least a catalyst which activates oxygen, a conductive material and a binder, when a thermal decomposition starting temperature of the binder is T1° C. and a thermal decomposition ending temperature of the binder is T2° C. A signal with any of mass numbers of 81, 100, 132 and 200 is present in pyrolysis mass spectrometry of the binder in a range of T1° C. to T2° C. Where a peak area at T1° C. is X and a peak area at T2° C. is Y, the X and Y satisfy a relation of $2X \geq Y$.

14 Claims, 3 Drawing Sheets

(56) References Cited

OTHER PUBLICATIONS

Takashi Kuboki, et al., "Lithium-air batteries using hydrophobic room temperature ionic liquid electrolyte", Journal of Power Sources, 146, 2005, 4 pages.

Jiang Lonfei, et al., "Mechanisms of Pyrolysis of Fluoropolymers", Journal of Analytical and Applied Pyrolysis, 10, 1986, 8 pages.
Combined Chinese Office Action and Search Report issued Oct. 30, 2015 in Patent Application No. 201410095137.X (with English language translation).

* cited by examiner

NONAQUEOUS ELECTROLYTE AIR BATTERY

CROSS-REFERENCE TO RELATED APPLICATION

This application is based upon and claims the benefit of priority from Japanese Patent Applications No. 2013-064795 Mar. 26, 2013 and No. 2014-049515 Mar. 12, 2014; the entire contents of which are incorporated herein by reference.

FIELD

Embodiments described herein relate generally to a nonaqueous electrolyte air battery.

BACKGROUND

In recent years, the market of portable information devices such as cellular phones and electronic mail terminals has been rapidly expanding. With downsizing and lightening of these devices, their power supplies are also required to be downsized and lightened. Currently, lithium ion secondary batteries, which have a high energy density, are frequently used, but batteries with which a higher capacity is obtained are desired.

Air batteries using oxygen in the air for a positive electrode active material can be expected to have an increased capacity because it is not necessary to include a positive electrode active material in the battery. Particularly, nonaqueous electrolyte air batteries using lithium for a negative electrode have a high theoretical energy density and are being extensively studies.

DETAILED DESCRIPTION

Figure 1:
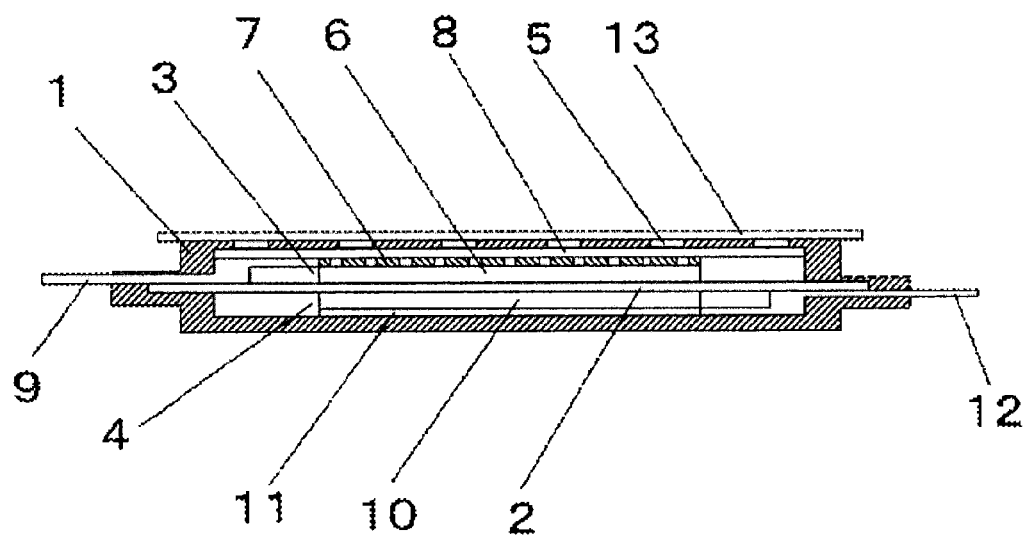
FIG. 1 is a sectional conceptual view of a nonaqueous electrolyte air battery of an embodiment.

A nonaqueous electrolyte air battery has a positive electrode a separator; a negative electrode and an exterior member comprising holes for supplying oxygen to the positive electrode. The positive electrode comprises at least a catalyst which activates oxygen, a conductive material and a binder. When a thermal decomposition starting temperature of the binder is $T1°$ C. and a thermal decomposition ending temperature of the binder is $T2°$ C., a signal with any of mass numbers of 81, 100, 132 and 200 is present in pyrolysis mass spectrometry of the binder in a range of $T1°$ C. to $T2°$ C. (inclusive). Where a peak area at $T1°$ C. is X and a peak area at $T2°$ C. is Y, the X and Y satisfy a relation of $2X \geq Y$. The binder is a polymer containing fluorine. The decomposition starting temperature of the binder is a temperature at which in a principal weight decrease process, a weight is decreased by 5% of a weight loss in the weight decrease process when the binder is analyzed by a thermogravimetric analyzer. The thermal decomposition ending temperature of the binder is a temperature at which in a principal weight decrease process, a weight is decreased by 95% of a weight loss in the weight decrease process when the binder is analyzed by a thermogravimetric analyzer. The mass spectrum signal area is an area of a signal with a mass number at which the mass spectrum signal area from $T1°$ C. to $T2°$ C. (inclusive) is a maximum area among a plurality of signals selected in terms of mass numbers of 81, 100, 132 and 200 in a mass spectrum of the binder alone.

In conventional nonaqueous electrode air batteries, oxygen captured in the battery at the time of discharge is activated with a catalyst carried on a positive electrode, and reacts with a lithium ion dissolved in a nonaqueous electrolyte to produce a lithium oxide. At the time of charge, on the other hand, the lithium oxide is reduced to release a lithium ion and oxygen. The reaction is reversible, and the fundamental life is infinite, but actually the battery is degraded. In the nonaqueous electrolyte air battery, a reaction mechanism at the time of charge-discharge is known. For example, at the time of charge, generation of carbon dioxide due to decomposition of a nonaqueous electrolyte occurs in addition to a reaction of releasing a lithium ion and oxygen from a lithium oxide. Therefore, the cycle life is reduced because the nonaqueous electrolyte is consumed by charge-discharge.

On the other hand, the present inventors have extensively conducted studies on the aforementioned problems, and resultantly found that a binder-derived gas generated at the time of heating a positive electrode has correlation with the cycle life of a nonaqueous electrolyte air battery.

As described above, a reduction reaction of oxygen at a positive electrode occurs at the surface of a catalyst carried on the positive electrode, a fluororesin excellent in oxidation resistance is used as a binder that fixes the catalyst to a conductive material. As described above, it is considered that oxygen is released from a lithium oxide at the time of charge, and in this process, active oxygen and a nonaqueous electrolyte come into contact with each other, resulting in decomposition of the nonaqueous electrolyte. That is, by minimizing contact of a positive electrode catalyst with a nonaqueous electrolyte, a reaction of active oxygen with the nonaqueous electrolyte can be suppressed to improve the cycle life.

A reaction of active oxygen with a nonaqueous electrolyte can be measured only when a battery is actually assembled and operated, but the present inventors have found that by giving attention to a dependency on temperature of a gas component released at the time of elevating the temperature of the positive electrode, a reaction of active oxygen with a nonaqueous electrolyte can be predicted to improve cycle characteristics.

A nonaqueous electrolyte air battery of an embodiment will be described in detail below. The nonaqueous electrolyte air battery of the embodiment has the positive electrode, the negative electrode and a separator sandwiched between the positive electrode and the negative electrode, and has an exterior member which infiltrates a nonaqueous electrolyte, stores these components and includes holes for supplying air to the positive electrode.

FIG. 1 illustrates a conceptual view of the nonaqueous electrolyte air battery of the embodiment. The nonaqueous electrolyte air battery in FIG. 1 includes an exterior member 1, a separator 2, a positive electrode 3, a negative electrode 4, holes 5, a positive electrode catalyst layer 6, a positive electrode current collector 7, a positive electrode terminal 8, an air diffusion layer 9, a negative electrode active material-containing layer 10, a negative electrode current collector 11, a negative electrode terminal 12 and a seal tape 13.

The nonaqueous electrolyte air battery includes the exterior member 1 made of, for example, a later-described laminate film with the inner surface formed from a thermoplastic resin layer. For example, the exterior member 1 includes a laminate film heat-sealed at three sides where inner surfaces are superimposed on each other. The separator 2 is disposed within the exterior member 1, and its end part may be sandwiched between the heat-sealed parts. The positive electrode 3 is stored on the upper side and the negative electrode 4 is stored on the lower side with the separator 2 sandwiched therebetween. The hole 5 is opened in the wall surface of the exterior member 1 on the positive electrode side. The hole 5 is intended to supply oxygen to the positive electrode 3.

Figure 2:
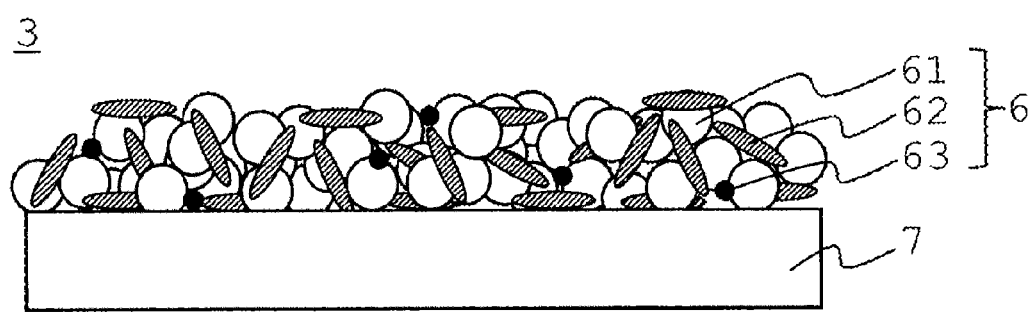
FIG. 2 is a sectional conceptual view of a positive electrode of the embodiment.

The positive electrode 3 includes the positive electrode catalyst layer 6 which is in contact with one surface of the separator 2, and the positive electrode current collector 7 carrying the positive electrode catalyst layer 6 and formed of, for example, a porous conductive substrate. FIG. 2 illustrates a sectional conceptual view of the positive electrode 3. The positive electrode catalyst layer 6 in FIG. 2 includes a positive electrode catalyst 61, a binder 62 and a conductive material 63. The positive electrode terminal 8 is electrically connected to the positive electrode current collector 7 at one end and extends to the outside through the heat-sealed part (portion where laminate films are heat-fused to each other) of the exterior member 1 at the other end. The air diffusion layer 9 is disposed on the positive electrode current collector 7. The air diffusion layer 9 is not particularly limited as long as air introduced through the hole 5 can be supplied to the positive electrode 3, and examples may include porous films including polyethylene (PE), polypropylene (PP) or a fluororesin such as polytetrafluoroethylene (PTFE), nonwoven fabrics made of synthetic resins such as polypropylene and PTFE, and glass fiber nonwoven fabrics.

The negative electrode 4 includes the negative electrode active material-containing layer 10 which is in contact with the opposite surface of the separator 2, and the negative electrode current collector 11 carrying the negative electrode active material-containing layer 10 and formed of, for example, a porous conductive substrate. The negative electrode terminal 12 is electrically connected to the negative electrode current collector 11 at one end and extends to the outside through the heat-sealed part (portion where laminate films are heat-fused to each other) of the exterior member 1 at the other end. The extending direction of the negative electrode terminal 12 is reverse to the extending direction of the positive electrode terminal 8.

The seal tape 13 blocking the hole 5 is detachably disposed on the outer surface of the exterior member 1. Air can be supplied to the positive electrode catalyst layer 6 by detaching the seal tape 13 at the time of using the battery.

The exterior member 1 can be formed from, for example, a metal plate, a sheet made of a laminate film having a resin layer, or the like.

The metal plate can be formed from, for example, iron, stainless steel or aluminum.

Preferably the sheet includes a metal layer and a resin layer covering the metal layer. Preferably the metal layer is formed from an aluminum foil. On the other hand, the resin layer can be formed from a thermoplastic resin such as polyethylene and polypropylene. The resin layer may have a single-layer or multi-layer structure.

(Positive Electrode)

The positive electrode of the embodiment can be prepared in the following manner. Minimum components of the positive electrode are a catalyst, a conductive material, a binder and a current collector. In this case, first the conductive material and the binder are mixed and kneaded to prepare the conductive material covered with the binder. On the other hand, the catalyst and the conductive material are mixed and kneaded to prepare the conductive material carrying the catalyst on the surface. Then, the conductive material covered with the binder is mixed with the conductive material carrying the catalyst on the surface, and the mixture is molded into a sheet, and bonded to the current collector, whereby the positive electrode of the embodiment can be prepared.

As the binder to be used for the positive electrode, a polymer containing fluorine can be used. The polymer containing fluorine is containing at least one selected from polyvinylidene fluoride (PVdF), polytetrafluoroethylene (PTFE), polychlorotrifluoroethylene, polyvinyl fluoride, ethylene, a tetrafluoroethylene copolymer, a polyvinylidene fluoride-hexafluoropropene copolymer and a polytetrafluoroethylene-hexafluoropropene copolymer.

Further, it is desirable to contain one or more compound selected from at least vinylidene difluoride, tetrafluoroethylene, chlorotrifluoroethylene, vinyl fluoride, ethylene, hexafluoropropene, a tetrafluoroethylene copolymer, a polyvinylidene fluoride-hexafluoropropene copolymer and a polytetrafluoroethylene-hexafluoropropene copolymer as a raw material of the polymer containing fluorine.

The conductive material to be used for the positive electrode can be used without being particularly limited as long as it has conductivity, and one that is not dissolved in a nonaqueous electrolyte and is hard to be oxidized with oxygen is preferred. Specific examples may include carbonaceous substances, conductive ceramics and metals. Examples of the carbonaceous substance may include natural graphite, artificial graphite, graphene, carbon fibers, carbon nanotubes, ketjen black, acetylene black, carbon black, furnace black, activated carbon, activated carbon fibers and charcoal. Examples of the conductive ceramic may include metal oxides such as those of In and Sn, and carbides such as SiC. Examples of the metal may include metals such as Al and Ti and alloys such as SUS.

The catalyst to be used for the positive electrode can be selected from metals, metal oxides, complexes and the like which have been heretofore used as a positive electrode catalyst for air batteries or an air electrode catalyst for fuel cells. The metal is preferably at least one metal selected from Au, Pt, Pd and Ag. The metal oxide is preferably an oxide including at least one metal selected from Ti, Zr, V, Nb, Ta, Cr, Mo, W, Mn, Fe, Sn, Co, Rh, Ir, Ni, Cu, Ag, In, Sn, La and Ce. Specific examples of the metal oxide may include $Fe_2O_3$, $Fe_2O_4$, $Co_2O_4$, NiO, CuO, $CoFe_2O_4$ and $La_{0.8}Sr_{0.2}MnO_3$. The complex is preferably a complex having as a core metal a metal selected from Fe, Ni and Co and having a plane tetradenate ligand such as phthalocyanine, porphyrin and salen. Specific examples of the complex may include cobalt phthalocyanine, iron phthalocyanine, nickel phthalocyanine, cobalt tetraphenylporphyrin, iron tetraphenylporphyrin and nickel tetraphenylporphyrin.

The catalyst, the binder and a small amount of the conductive material can be mixed and kneaded in a dry state or in a solvent. When they are mixed and kneaded in a dry state, a solid catalyst and a conductive material are first put in a kneader to be mixed and kneaded, a binder is then put in the kneader, and the mixture is stirred. When they are mixed and kneaded in a solvent, a binder is dissolved in a solvent, and the solution and a conductive material are put in a kneader and stirred, and then after the mixture is taken out from the kneader, the solvent is removed. The solvent is preferably a solvent that dissolves the binder, and for example water, N-methylpyrrolidone (NMP), methyl ethyl ketone (MEK) or the like can be used.

A catalyst covered with a binder and including a small amount of a conductive material and a conductive material are mixed and kneaded preferably in a dry state, and both the catalyst and the conductive material are put in a kneader at the same time and stirred. Input energy in stirring is preferably lower than input energy in mixing and kneading of the binder and the conductive material and in mixing and kneading of the catalyst and the conductive material.

For the current collector, a conductive substrate having through-holes, such as a mesh, a punched metal or an expanded metal, can be used because such a substrate causes oxygen to be diffused quickly. Examples of the material of the conductive substrate may include stainless steel, nickel, aluminum, iron and titanium. The surface of the current collector may be covered with an oxidation-resistant metal or alloy in order to suppress oxidation.

The mixture of the conductive material covered with the binder and the conductive material carrying the catalyst can be carried on the current collector in a dry state or a solvent. When the mixture is carried in a dry state, a solid mixture is laid over the current collector and pressed. When the mixture is carried in a solvent state, a solid mixture is put in a solvent, and the mixture is applied to the current collector and dried.

The contents of the catalyst, the conductive material and the binder in the positive electrode are 1% by mass to 20% by mass (inclusive) for the catalyst, 1% by mass to 90% by mass (inclusive) for the conductive material and 1% by mass to 30% by mass (inclusive) for the binder. The thickness of the positive electrode except the current collector is preferably in a range of 2 μm to 600 μm (inclusive).

By the aforementioned production method, a positive electrode can be prepared which has at least a catalyst which activates oxygen, a conductive material and a binder, wherein when a thermal decomposition starting temperature of the binder is T1° C. and a thermal decomposition ending temperature is T2° C., peaks are present in an ion chromatogram with a mass number selected from at least 81, 100, 132 and 200 in pyrolysis gas chromatograph mass spectrometry at a thermal decomposition temperature of $(T1+T2)/2$° C., and where the peak area at T1° C. is X and the peak area at T2° C. is Y, the X and Y satisfy a relation of $2X \geq Y$.

Here, the decomposition starting temperature of the binder is a temperature at which in a principal weight decrease process, the weight is decreased by 5% of a weight loss in the weight decrease process when the binder is analyzed by a thermogravimetric analyzer, the thermal decomposition ending temperature of the binder is a temperature at which in a principal weight decrease process, the weight is decreased by 95% of a weight loss in the weight decrease process when the binder is analyzed by a thermogravimetric analyzer, and the peak area is an area of a peak with a mass number that gives the maximum area, among ion chromatograms extracted with mass numbers of 81, 100, 132 and 200, in pyrolysis gas chromatograph mass spectrometry at a thermal decomposition temperature $(T1+T2)/2$° C. for the binder alone.

The thermal decomposition temperature can be measured using a thermogravimetric mass spectrometer (TG-MS) which performs thermogravimetric analysis and mass spectrometry of a generated gas in parallel. The atmosphere during measurement is not particularly limited as long as measurement is performed under a non-oxidation atmosphere, and for example an inert gas such as helium, argon and nitrogen can be used.

The weight decrease process which is excluded at the time of calculating a thermal decomposition temperature is a weight decrease process on the low temperature side at which moisture and carbon dioxide etc. adsorbed during storage of the binder are released, and can be discriminated by a TG-MS apparatus or an EGA-MS apparatus. The residual weight which is excluded at the time of calculating a thermal decomposition ending temperature is derived from a substance for which a weight loss is hardly observed under an inert gas atmosphere, such as carbon and tar components produced by thermal decomposition of the binder, or a ceramic material incorporated or added in the production process. At the time of TG, TG-MS or EGA-MS measurement, the principal weight decrease process is observed as a large peak, whereas the above-mentioned residual weight can be discriminated as a broad peak or a slope independently of the aforementioned peak. Further, a non-principal weight decrease process other than the weight decrease process excluded on the low temperature side and the high temperature side is observed as a small peak, and is a peak or a slope with a variation of less than 5% by weight of a measurement sample.

Figure 3:
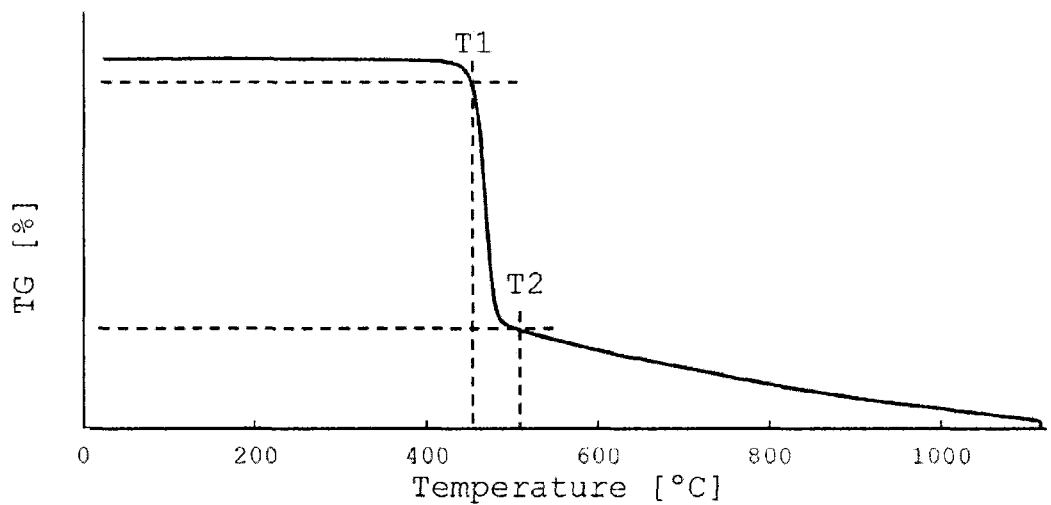
FIG. 3 is a graph of thermogravimetry of PVdF.

First, a thermal decomposition temperature as a standard will be described with reference to the graph of thermogravimetric change of PVdF alone which does not include an active material in FIG. 3. Thermal decomposition starting and ending temperatures in TG-MS are determined by observing a weight loss amount of the binder when the temperature is elevated from room temperature (25° C.) to 1000° C. PVdF showed a weight loss of 2% in a range of room temperature (25° C.) to 200° C., and showed no weight loss in a range of 200° C. to 400° C. Thereafter, PVdF showed a weight loss of 3.5% from 400° C. to 450° C., 63% from 450° C. to 500° C. and 3.5% from 500° C. to 520° C., and thereafter the weight was gradually decreased. That is, the principal weight decrease process in thermogravimetric analysis of PVdF lies in a range of 400° C. to 520° C., the thermal decomposition temperature T1 is 450° C., and the thermal decomposition ending temperature T2 is 500° C.

Figure 4:
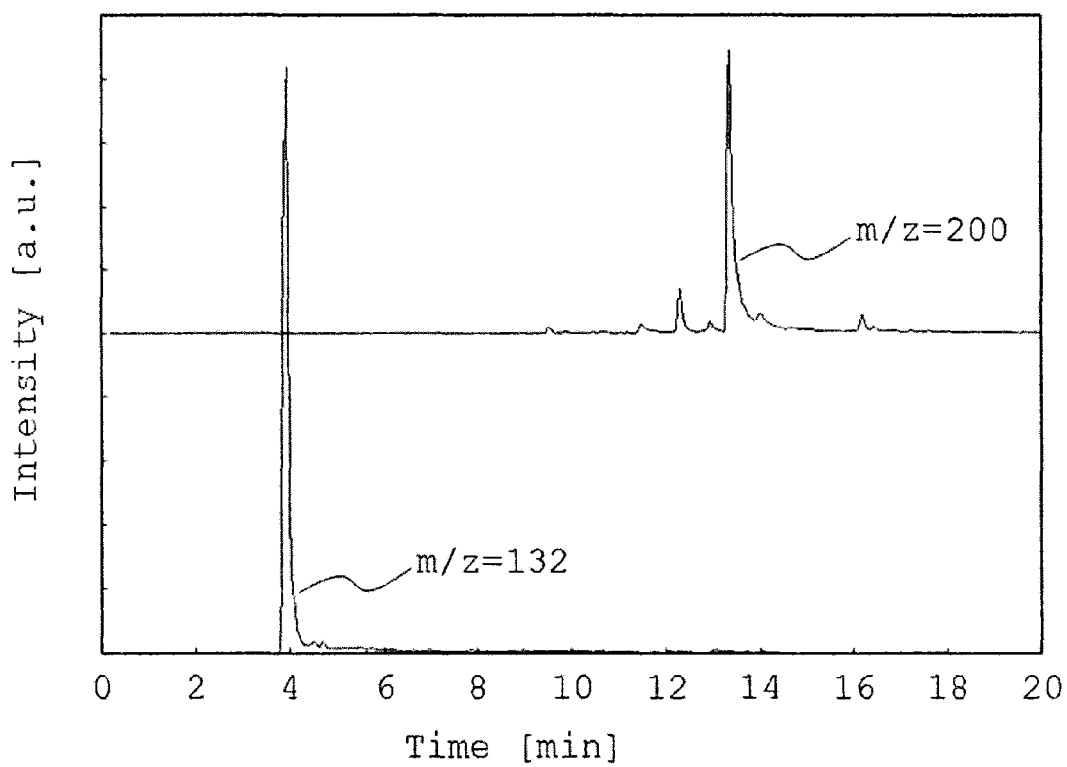
FIG. 4 is an ion chromatogram of a pyrolysis gas chromatography mass spectrometry of PVdF.

Now assume that a binder that is not involved in protection of the catalyst is thermally decomposed at a temperature of T1 (450° C.) to T2 (500° C.) (inclusive), and a binder that is involved in protection of the catalyst is thermally decomposed at a temperature of lower than T1 (450° C.). The thermal decomposition time in pyrolysis gas chromatograph mass spectrometry is preferably 1 to 60 seconds (inclusive). Heating for more than 60 seconds is not preferred because a binder that does not contribute to catalyst protection also moves to the vicinity of the catalyst due to diffusion. FIG. 4 illustrates an ion chromatogram with mass numbers of 132 and 200 in pyrolysis gas chromatograph mass spectrometry where heating was performed for 30 seconds at 475° C. which is equivalent to $(T1+T2)/2$. It has been confirmed from FIG. 4 that peaks are present in an ion chromatogram with mass numbers of 132 and 200, and the area of the peak with a mass number 132 is larger than the area of the peak with a mass number of 200.

Figure 5:
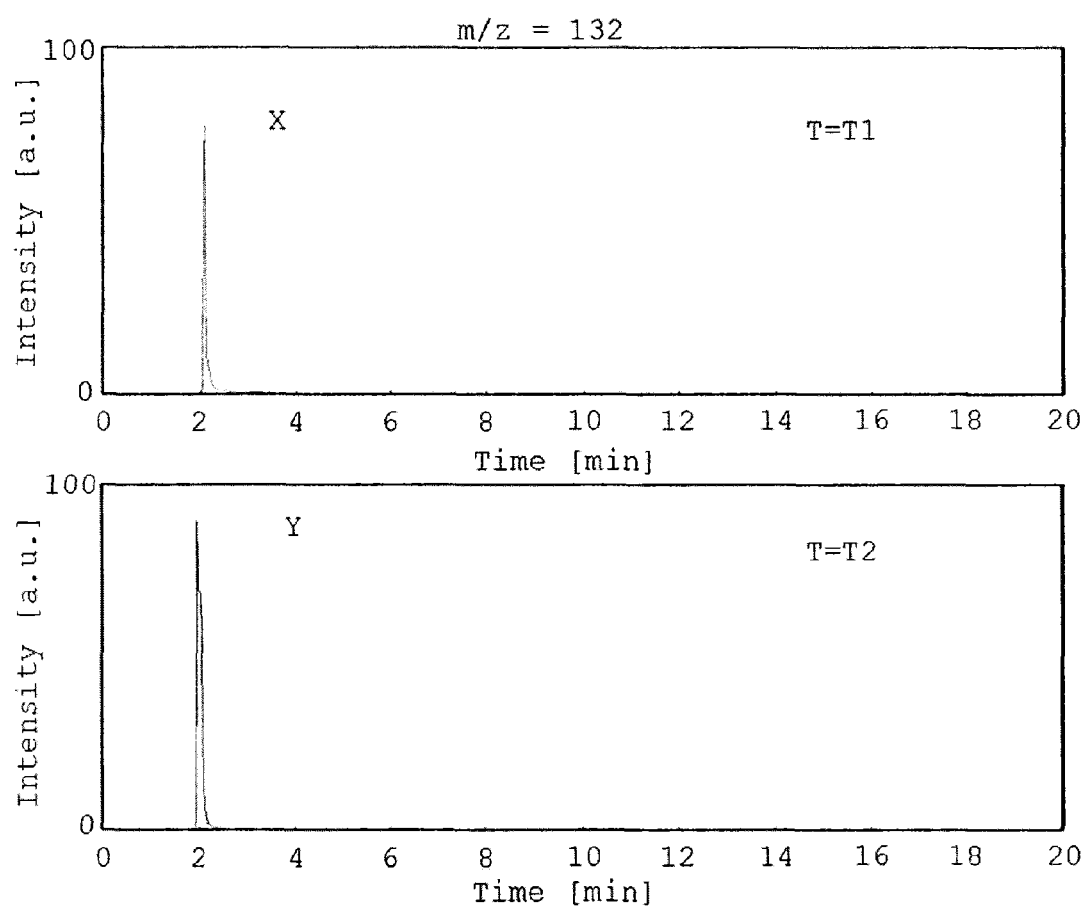
FIG. 5 is an ion chromatogram of a pyrolysis gas chromatography mass spectrometry of a positive electrode catalyst layer of the embodiment.

Next, a method for determining a ratio of an amount of a binder that contributes to catalyst protection and an amount of a binder that does not contribute to catalyst protection will be described with reference to an ion chromatogram in pyrolysis gas chromatograph mass spectrometry of the positive electrode including a catalyst, a binder and a conductive material in the embodiment as illustrated in FIG. 5. When subjected to pyrolysis mass spectrometry, a binder including fluorine is found to have a signal with at least one of mass numbers of 81, 100, 132 and 200 depending on a compound that forms the binder. For calculation of the area, an ion chromatogram where signals with mass numbers specific to a binder including fluorine of 81, 100, 132 and 200 are extracted in the pyrolysis gas chromatograph mass spectrometer is used. Areas of an amount of a binder that contributes to catalyst protection and an amount of a binder that does not contribute to catalyst protection are calculated. For calculation of the area, a signal with a mass number at which the signal area is the maximum area, among peaks of an ion chromatograph with a mass number selected from mass numbers of 81, 100, 132 and 200, in pyrolysis gas chromatograph mass spectrometry at a thermal decomposition temperature $(T1+T2)/2°$ C. where the thermal decomposition starting temperature of the binder is $T1°$ C. and the thermal decomposition ending temperature is $T2°$ C. is used. In the ion chromatograph of PVdF alone in the embodiment, an area of a signal with a mass number of 132 is the largest, and therefore an area of a signal with a mass number of 132 is also determined in measurement of the positive electrode. A peak area of an ion chromatograph with a mass number of 132 at the thermal decomposition starting temperature $T1°$ C. is X and a peak area of an ion chromatograph with a mass number of 132 at the thermal decomposition temperature $T2°$ C. is Y. In FIG. 4 used for explanation, an area of a signal with a mass number of 132 is determined because PVdF is employed for the binder, but in some cases, X and Y can be determined from an area of a signal with a mass number of 81 or the like, when the binder is PTFE or the like.

In a positive electrode in which disposition of a catalyst and a binder is adjusted so that X and Y determined in the above-described method satisfy $2X \geq Y$, the amount of a binder that contributes to catalyst protection is shown to be larger than the amount of a binder that does not contribute to catalyst protection. A mechanism with which cycle characteristics are improved as described above when $2X \geq Y$ is not necessarily clear, but may be estimated as follows. At the time of charge, oxygen is released from a lithium oxide, and has the highest reaction activity in a state of transition to active oxygen, and therefore when a nonaqueous electrolyte is present in the vicinity, active oxygen is not released as a molecule, but reacts with the nonaqueous electrolyte to release carbon dioxide, so that the cycle life may be reduced. In this case, it is estimated that the amount of a binder that contributes to catalyst protection is increased to preclude the nonaqueous electrolyte which comes into contact with active oxygen, so that the cycle life is improved. When the periphery of the catalyst is wholly covered with the binder, conductivity is lost, and therefore it is preferred to secure conductivity by adding a small amount of a conductive material at the time of mixing and kneading the catalyst with the binder.

(Negative Electrode)

The negative electrode includes a negative electrode current collector and a negative electrode active material-containing layer carried on the negative electrode current collector.

For the negative electrode active material, for example, a material that absorbs and releases a lithium ion can be used.

The material that absorbs and releases a lithium ion is not particularly limited, and a material usable for lithium ion batteries or lithium batteries can be used. Particularly, it is preferred to use as the negative electrode active material at least one material selected from the group consisting of a metal oxide, a metal sulfide, a metal nitride, a lithium metal, a lithium alloy, a lithium composite oxide and a carbonaceous substance that absorbs and releases a lithium ion.

Examples of the carbonaceous substance that absorbs and releases a lithium ion may include graphitic materials or carbonaceous materials such as graphite, coke, carbon fibers and spherical carbon, and graphitic materials or carbonaceous materials obtained by heat-treating a thermosetting resin, an isotropic pitch, a mesophase pitch, a mesophase pitch-based carbon fibers, mesophase microspheres or the like from 500° C. to 3000° C. (inclusive).

Examples of the metal oxide may include tin oxides, silicon oxides, lithium titanium oxides, niobium oxides and tungsten oxides.

Examples of the metal sulfide may include tin sulfides and titanium sulfides.

Examples of the metal nitride may include lithium cobalt nitrides, lithium iron nitrides and lithium manganese nitrides.

Examples of the lithium alloy may include lithium aluminum alloys, lithium tin alloys, lithium lead alloys and lithium silicon alloys.

For the negative electrode current collector, for example, a conductive substrate having through-holes or a nonporous conductive substrate can be used. These conductive substrates can be formed from, for example, copper, stainless steel or nickel. For a conductive substrate of porous structure, a mesh, a punched metal, an expanded metal or the like can be used, or one obtained by forming a negative electrode active material-containing layer carried on a metal foil and then boring the metal foil can be used as a conductive substrate of porous structure.

A negative electrode including a negative active material such as carbonaceous substance can be prepared by, for example, mixing and kneading a negative electrode active material and a binder in the presence of a solvent, applying the resulting suspension to a current collector, and drying the suspension, followed by performing one-time pressing or multi-stage pressing of two to five times.

For the binder, for example, polytetrafluoroethylene (PTFE), polyvinylidene fluoride (PVdF), ethylene-propylene-butadiene rubber (EPBR), styrene-butadiene rubber (SBR), carboxymethyl cellulose (CMC) or the like can be used.

The blending amounts of the carbonaceous substance and the binder are preferably 80% by mass to 98% by mass (inclusive) for the carbonaceous substance and a range of 2% by mass to 20% by mass (inclusive) for the binder.

Further, when a metal material such as a lithium metal or a lithium alloy is used as the negative electrode active material, a negative electrode active material-containing layer can be formed without using a binder because such a metal material can be processed into a sheet shape even alone. Furthermore, a negative electrode active material-containing layer formed of such a metal material can be connected directly to a negative electrode terminal.

(Nonaqueous Electrolyte)

The nonaqueous electrolyte is not particularly limited as long as it can be used for a lithium ion secondary battery.

For example, the nonaqueous electrolyte can include an organic solvent and a support electrolyte dissolved in the organic solvent. The organic solvent is desired to contain at least one selected from the group consisting of an ester, a carbonic acid ester, an ether, a nitrile and a compound with a substituent introduced into the aforementioned compound (ester, carbonic acid ester, ether and nitrile). One selected from an ester and a carbonic acid ester is preferred. Among esters, esters of cyclic structure are preferred, and particularly five-membered γ-butyrolactone (γ-BL) is preferred. A carbonic acid ester of either cyclic or chain structure can be used. The cyclic carbonic acid ester is preferably a carbonic acid ester of five-membered ring structure, and particularly ethylene carbonate (EC), vinylene carbonate (VC) and propylene carbonate (PC) are preferred. The chain carbonic acid ester is preferably a carbonic acid ester with a carbon number of 7 or less, and particularly dimethyl carbonate (DMC), diethyl carbonate (DEC) and ethyl methyl carbonate (EMC) are preferred.

An ether of either cyclic or chain structure can be used. As the cyclic ether, ethers of five-membered and six-membered structures are preferred, and particularly those that do not include a double bond are preferred. The chain ether is preferably one including five or more carbon atoms. Examples may include tetrahydropyran, dioxane, tetrahydrofuran, 2-methyl tetrahydrofuran, butyl ether and isopentyl ether.

Examples of the nitrile may include acetonitrile and propionitrile.

The organic solvents may be used alone, but more preferably two or more thereof are mixed and used. Particularly it is preferred to include carbonic acid esters, particularly preferably carbonic acid esters of five-membered ring structure, especially preferably EC or PC.

Preferred combinations of organic solvents include EC/PC, EC/γBL, EC/EMC, EC/PC/EMC, EC/EMC/DEC and EC/PC/γBL.

Further, as the nonaqueous electrolyte, one obtained by dissolving a support electrolyte in an ionic liquid can be used. The ionic liquid has a cation having a positive charge and an anion having a negative charge, and is nonvolatile. Therefore, by using an ionic liquid for the first nonaqueous electrolyte, the volatilization amount of the nonaqueous electrolyte from holes can be reduced.

Further, when a hydrophobic ionic liquid is selected, ingress of moisture from holes can be suppressed. Therefore, by using a hydrophobic ionic liquid, the life of the air battery can be further increased.

Examples of the cation may include at least one selected from the group consisting of an ammonium ion, an imidazolium ion, a phosphonium ion and a cation with a substituent introduced into the aforementioned ion (ammonium ion, imidazolium ion and phosphonium ion). Specific examples may include, but are not limited to, an N-butyl-N,N,N-trimethylammonium ion, an N-ethyl-N,N-dimethyl-N-propylammonium ion, an N-butyl-N-ethyl-N,N-dimethylammonium ion, an N-butyl-N,N-dimethyl-N-propylammonium ion, an N-propyl-N-methylpyrrolidinium ion, an N-butyl-N-methylpyrrolidinium ion, a 1-ethyl-3-methylimidazolium ion, a 1-butyl-3-methylimidazolium ion, a 1-ethyl-2,3-dimethylimidazolium ion and a 1-ethyl-3,4-dimethylimidazolium ion.

Examples of the anion may include at least one selected from the group consisting of $PF_6^-$, $BF_4^-$, $CF_3SO_3^-$, $C_4F_9SO_3^-$, $[B(OOC-COO)_2]^-$, $[(CN)_2N]^-$, $[(CF_3SO_2)_2N]^-$, $[(C_2F_9SO_2)_2N]^-$, $BF_3(CF_3)^-$ and an anion with a substituent introduced into the aforementioned ion ($PF_6^-$, $BF_4^-$, $CF_3SO_3^-$, $C_4F_9SO_3^-$, $[B(OOC-COO)_2]^-$, $[(CN)_2N]^-$, $[(CF_3SO_2)_2N]^-$, $[(C_2F_5SO_2)_2N]^-$ and $BF_3(CF_3)^-$). For the anion, use of $BF_3(CF_3)^-$, $[(CF_3SO_2)_2N]^-$ having a sulfonyl imide structure or $[(C_2F_5SO_2)_2N]^-$ is more preferred because the ionic liquid becomes hydrophobic. $[(CF_3SO_2)_2N]^-$ is especially preferred because an ionic liquid having a lower viscosity can be achieved.

The support electrolyte to be dissolved in an organic solvent or an ionic liquid is not particularly limited as long as it can be used for a lithium ion secondary battery, and examples may include $LiPF_6$, $LiBF_4$, $Li(CF_3SO_3)$, $Li(C_4F_9SO_3)$, $Li[B(OOC-COO)_2]$, $Li[(CN)_2N]$, $Li[(CF_3SO_2)_2N]$, $Li[(C_2F_5SO_2)_2N]$ and a compound with a substituent introduced into the aforementioned compound ($LiPF_6$, $LiBF_4$, $Li(CF_3SO_3)$, $Li(C_4F_9SO_3)$, $Li[B(OOC-COO)_2]$, $Li[(CN)_2N]$, $Li[(CF_3SO_2)_2N]$ and $Li[(C_2F_5SO_2)_2N]$). One or more of the support electrolytes may be used.

(Separator)

The separator is disposed between a positive electrode and a negative electrode to retain an electric insulation and ensure a conduction path for lithium ions. For the separator, a porous film or a solid electrolyte can be used.

The porous film is formed of, for example, a porous membrane made of a synthetic resin such as polytetrafluoroethylene, polypropylene or polyethylene, or a porous membrane made of a ceramic, and may have a structure in which two or more of these porous membranes are stacked.

The thickness of the separator is preferably 30 μm or less. When the thickness is more than 30 μm, the distance between positive and negative electrodes may be increased, leading to an increase in internal resistance. Further, the lower limit value of the thickness is preferably 5 μm. When the thickness is less than 5 μm, an internal short circuit may easily occur due to a significant reduction in strength of the separator. The upper limit value of the thickness is more preferably 25 μm, and also the lower limit value is more preferably 1.0 μm.

Preferably the separator has a thermal shrinkage of 20% or less when left standing under a condition of 120° C. for 1 hour. When the thermal shrinkage is more than 20%, the possibility is increased that a short circuit occurs upon heating. The thermal shrinkage is more preferably 15% or less.

Preferably the separator has a porosity in a range of 30% to 70% (inclusive). This is based on the following reasons. When the porosity is less than 30%, it may be difficult to achieve high electrolyte retainability in the separator. On the other hand, when the porosity is more than 70%, a sufficient separator strength may not be achieved. The porosity is more preferably in a range of 35 to 60% (inclusive).

Preferably the separator has an air permeability of 500 seconds/100 cm$^3$ or less. When the air permeability is more than 500 seconds/100 cm$^3$, it may be difficult to achieve a high lithium ion mobility in a separator 204. Further, the lower limit value of the air permeability is 30 seconds/100 cm$^3$. This is because when the air permeability is less than 30 seconds/100 cm$^3$, a sufficient separator strength may not be achieved.

The upper limit value of the air permeability is more preferably 300 seconds/100 cm$^3$, and also the lower limit value is more preferably 50 seconds/100 cm$^3$.

The solid electrolyte is desired to be one that is formed of a material, which is not dissolved in and swollen with a nonaqueous electrolyte and which has lithium ion conductivity, and is nonporous and allows selective permeation of lithium ions.

The material having lithium ion conductivity is preferably at least one selected from the group consisting of an organic polymer, an oxide and a sulfide. Each of the materials exhibits lithium ion conductivity in a solid state, so that a solid electrolyte layer which is nonporous and allows selective permeation of lithium ions can be achieved.

The organic polymer is used along with a support electrolyte. Specific examples of the organic polymer may include polyethylene oxide-containing polymers and polyvinyl-containing polymers. The polyethylene oxide-containing polymer includes a polyethylene oxide as a main chain and may be partially branched. Preferably a hydroxyl group at the end of the polyethylene oxide is protected with an ether or ester bond. The polyvinyl-containing polymer includes a polyvinyl chain as a main chain and preferably contains a functional group including an ester bond or a carbonic acid ester bond on the side chain branched from the main chain. Particularly, the polyethylene oxide-containing polymer is desirable because it is excellent in hopping conductivity of lithium ions. The organic polymer may include a small amount of a softening agent such as dibutyl phthalate.

The support electrolyte to be used along with the organic polymer is not particularly limited as long as it can be used for a lithium secondary battery. For example, a type of support electrolyte similar to those described in connection with the first nonaqueous electrolyte can be used. $LiPF_6$, $LiBF_4$, $Li(CF_3SO_3)$, $Li[(CF_3SO_2)_2N]$ and lithium salts with a substituent introduced into the aforementioned compound are especially preferred.

Examples of the oxide may include oxide glass and oxide crystals. Each of the oxides includes lithium as a constituent element, and does not require a support electrolyte unlike the solid electrolyte layer including an organic polymer. Examples of the oxide glass may include oxides including Li and at least one element selected from the group consisting of B, Si and P. Specific examples may include $Li_4SiO_4$—$Li_3BO_3$-based oxides. Further, examples of the oxide crystal may include oxides including Li and at least one element selected from the group consisting of Al, Ti, P, La, N, Si, In and Nb. Specific examples may include $Na_3Zr_2Si_2PO_{12}$, $LiTi(PO_4)_3$, $LiAlTi(PO_4)_3$, $Li_7La_3Zr_2O_{12}$ and $La_{0.5}Li_{0.5}TiO_3$.

Examples of the sulfide may include sulfide glass and sulfide crystals. Each of the sulfides includes lithium as a constituent element, and does not require a support electrolyte unlike the solid electrolyte layer including an organic polymer. Specific examples may include $Li_3PS_4$, $Li_4SiS_4$, $LiGeS_4$—$Li_3PS_4$, LiS—$SiS_2$-based sulfides, SiS—$P_2S_5$-based sulfides, LiS—$B_2S_3$-based sulfides and $Li_2S$—$SiS_2$—$Li_4SiO_4$-based sulfides. Particularly $Li_2S$—$P_2S_5$ and $Li_{3.25}Ge_{0.25}P_{0.75}S_4$ etc. have a high conductivity and are therefore preferred.

When an oxide and/or sulfide included in the solid electrolyte layer are poor in reduction resistance, it is preferred to dispose a porous membrane, a nonwoven fabric or a metal oxide layer between the solid electrolyte layer and the negative electrode. By disposing a porous membrane, a nonwoven fabric or a metal oxide layer between the solid electrolyte layer and the negative electrode, the solid electrolyte layer is prevented from coming into contact with the negative electrode, so that a situation can be avoided in which an oxide and/or a sulfide included in the solid electrolyte layer are reductively decomposed by coming into contact with the negative electrode, leading to degradation of the solid electrolyte layer. As the porous membrane or nonwoven fabric, one capable of being used as a conventional separator for a lithium ion secondary battery, such as a porous membrane made of polyethylene, a porous membrane made of polypropylene or a nonwoven fabric made of cellulose, can be used. The metal oxide layer is not particularly limited as long as it is formed of a metal oxide insoluble in a nonaqueous electrolyte on the negative electrode side, such as an aluminum oxide, a silicon oxide or a zinc oxide. Further, when an oxide and/or a sulfide included in the solid electrolyte layer are excellent in reduction resistance, the volume energy density can be improved, and therefore it is preferred to omit a porous membrane, a nonwoven fabric or a meal oxide layer.

When a solid electrolyte is used for the separator, different nonaqueous electrolytes can be used on the positive electrode side and on the negative electrode side. For example, when a nonaqueous electrolyte with a support electrolyte dissolved in a nonvolatile ionic liquid is disposed on the positive electrode side and a nonaqueous electrolyte with a support electrolyte dissolved in an organic solvent excellent in reduction resistance is disposed on the negative electrode side, a nonaqueous electrolyte air battery excellent in cycle characteristics can be achieved.

Example 1

PVdF was used as a binder. As a result of performing measurement by a thermogravimetric analyzer, a thermal decomposition temperature T1 was 450° C. and a thermal decomposition ending temperature T2 was 500° C. In pyrolysis gas chromatograph mass spectrometry at 475° C., fragments with mass numbers of 132 and 200 were present. By using $MnO_2$ as a positive electrode catalyst, PVdF as a binder and ketjen black as a conductive material, a positive electrode was prepared with the composition ratio of 60:20:20 in terms of a mass ratio.

First, the catalyst covered with the binder and including a small amount of the conductive material was obtained by the following technique. 60 parts by mass of $MnO_2$ and 1 part by mass of ketjen black were put in a stirring vessel provided with two stirring blades, and stirred for 30 minutes. A 10 mass % solution formed by dissolving 20 parts by mass of PVdF in NMP was put in the stirring vessel together with zirconia beads, and the mixture was stirred for further 30 minutes. The prepared solution was cleared of the zirconia beads by filtration, and then put in water, and precipitates were collected by filtration, and dried to prepare the catalyst covered with the binder and including a small amount of the conductive material.

81 parts by mass of the prepared catalyst covered with the binder and including a small amount of the conductive material and 19 parts by mass of ketjen black were put in a stirring vessel provided with two stirring blades, and stirred for 10 minutes. The prepared powder of catalyst, conductive material and binder was uniformly spread over a stainless steel mesh, rolled by a roll press and further dried under vacuum at 120° C. to prepare a positive electrode.

The catalyst layer of the prepared positive electrode was scraped off, and analysis was performed using a pyrolysis gas chromatograph mass spectrometer. As a result, peaks were present in an ion chromatogram with mass numbers of 132 and 200 at a thermal decomposition temperature of 475° C., and the peak with a mass number of 132 gave the largest area. Where a peak area at a thermal decomposition temperature of 450° C. was X and a peak area at a thermal decomposition temperature of 500° C. was Y in the peak, a relationship of $2X \geq Y$ was obtained with X:Y=40:60.

By using the obtained positive electrode, a negative electrode including lithium, a separator including a polypropylene nonwoven fabric, a nonaqueous electrolyte solution obtained by dissolving $LiClO_4$ in a 1:1 mixed solvent of EC and PC at a ratio of 1.0 M/L, and a laminated exterior member with holes disposed on the positive electrode side, a nonaqueous electrolyte air battery was prepared, and a charge-discharge cycle test was conducted under conditions of a discharge termination voltage of 2.0 V (vs Li/Li$^+$) and a charge termination voltage of 4.0 V (vs Li/Li$^+$)—CV termination current of 0.01 mA at 25° C. and a current value of 0.1 mA/cm$^2$ in dry air to confirm a cycle life. Here, the cycle life is a number of cycles at which the capacity is reduced to 900 of the initial discharge capacity. As a result, the cycle life was 450 cycles.

Example 2

A positive electrode was prepared by the same technique as that in Example 1 except that Co$_3$O$_4$ was used as a positive electrode catalyst. The catalyst layer of the prepared positive electrode was scraped off, and analysis was performed using a pyrolysis gas chromatograph mass spectrometer. As a result, peaks were present in an ion chromatogram with mass numbers of 132 and 200 at a thermal decomposition temperature of 475° C., and the peak with a mass number of 132 gave the largest area. Where a peak area at a thermal decomposition temperature of 450° C. was X and a peak area at a thermal decomposition temperature of 500° C. was Y in the peak, a relationship of 2X≥Y was obtained with X:Y=50:50. Using the obtained positive electrode, a nonaqueous electrolyte air battery was prepared in accordance with the same procedure as in Example 1, and cycle characteristics were evaluated. As a result, the cycle life was 420 cycles.

Example 3

A positive electrode was prepared by the same technique as that in Example 1 except that Fe$_3$O$_4$ was used as a positive electrode catalyst. The catalyst layer of the prepared positive electrode was scraped off, and analysis was performed using a pyrolysis gas chromatograph mass spectrometer. As a result, peaks were present in an ion chromatogram with mass numbers of 132 and 200 at a thermal decomposition temperature of 475° C., and the peak with a mass number of 132 gave the largest area. Where a peak area at a thermal decomposition temperature of 450° C. was X and a peak area at a thermal decomposition temperature of 500° C. was Y in the peak, a relationship of 2X≥Y was obtained with X:Y=40:60. Using the obtained positive electrode, a non-aqueous electrolyte air battery was prepared in accordance with the same procedure as in Example 1, and cycle characteristics were evaluated. As a result, the cycle life was 410 cycles.

Example 4

A positive electrode was prepared by the same technique as that in Example 1 except that CuO was used as a positive electrode catalyst. The catalyst layer of the prepared positive electrode was scraped off, and analysis was performed using a pyrolysis gas chromatograph mass spectrometer. As a result, peaks were present in an ion chromatogram with mass numbers of 132 and 200 at a thermal decomposition temperature of 475° C., and the peak with a mass number of 132 gave the largest area. Where a peak area at a thermal decomposition temperature of 450° C. was X and a peak area at a thermal decomposition temperature of 500° C. was Y in the peak, a relationship of 2X≥Y was obtained with X:Y=40:60. Using the obtained positive electrode, a non-aqueous electrolyte air battery was prepared in accordance with the same procedure as in Example 1, and cycle characteristics were evaluated. As a result, the cycle life was 400 cycles.

Example 5

A positive electrode was prepared by the same technique as that in Example 1 except that NiO was used as a positive electrode catalyst. The catalyst layer of the prepared positive electrode was scraped off, and analysis was performed using a pyrolysis gas chromatograph mass spectrometer. As a result, peaks were present in an ion chromatogram with mass numbers of 132 and 200 at a thermal decomposition temperature of 475° C., and the peak with a mass number of 132 gave the largest area. Where a peak area at a thermal decomposition temperature of 450° C. was X and a peak area at a thermal decomposition temperature of 500° C. was Y in the peak, a relationship of 2X≥Y was obtained with X:Y=40:60. Using the obtained positive electrode, a non-aqueous electrolyte air battery was prepared in accordance with the same procedure as in Example 1, and cycle characteristics were evaluated. As a result, the cycle life was 420 cycles.

Example 6

A nonaqueous electrolyte air battery was prepared by the same technique as that in Example 1 except that a nonaqueous electrolyte obtained by dissolving Li[(CF$_3$SO$_2$)$_2$N] at a ratio of 0.5 M/L in an ionic liquid having an N-ethyl-N,N-dimethyl-N-propylammonium ion as a cation and [(CF$_3$SO$_2$)$_2$N]— as an anion was used as a nonaqueous electrolyte, and cycle characteristics were evaluated. As a result, the cycle life was 500 cycles.

Example 7

A nonaqueous electrolyte air battery was prepared by the same technique as that in Example 1 except that a solid electrolyte obtained by molding sulfide glass formed of Li$_2$S—SiS$_2$—Li$_3$PO$_4$ in a thickness of 100 μm was used as a separator, a nonaqueous electrolyte obtained by dissolving LiPF$_6$ in a 1:1 mixed solvent of EC and MEC at a ratio of 1.0 M/L was used as a nonaqueous electrolyte on the negative electrode side, and a nonaqueous electrolyte obtained by dissolving Li[(CF$_3$SO$_2$)$_2$N] at a ratio of 0.5 M/L in an ionic liquid having an N-ethyl-N,N-dimethyl-N-propylammonium ion as a cation and [(CF$_3$SO$_2$)$_2$N]— as an anion was used, and cycle characteristics were evaluated. As a result, the cycle life was 600 cycles.

Comparative Example 1

PVdF was used as a binder. As a result of performing measurement by a thermogravimetric analyzer, a thermal decomposition temperature T1 was 450° C. and a thermal decomposition ending temperature T2 was 500° C. In pyrolysis gas chromatograph mass spectrometry at 475° C., fragments with mass numbers of 132 and 200 were present. By using MnO$_2$ as a positive electrode catalyst, PVdF as a binder and ketjen black as a conductive material, a positive electrode was prepared with the composition ratio of 60:20:20 in terms of a mass ratio.

First, 20 parts of PVdF were dissolved in NMP to prepare a 10 mass solution. The prepared NMP solution of PVdF was put in a stirring vessel provided with two stirring blades together with 60 parts by mass of MnO$_2$, 20 parts by mass of ketjen black and zirconia bead, and the mixture was stirred for 30 minutes. The prepared solution was cleared of the zirconia beads by filtration, and then put in water, and precipitates were collected by filtration, and dried to obtain a mixture of the catalyst, the conductive material and the binder as a powder. The prepared powder of catalyst, conductive material and binder was uniformly spread over a stainless steel mesh, rolled by a roll press and further dried under vacuum at 120° C. to prepare a positive electrode.

The catalyst layer of the prepared positive electrode was scraped off, and analysis was performed using a pyrolysis gas chromatograph mass spectrometer. As a result, peaks were present in an ion chromatogram with mass numbers of 132 and 200 at a thermal decomposition temperature of 475° C., and the peak with a mass number of 132 gave the largest area. Where a peak area at a thermal decomposition temperature of 450° C. was X and a peak area at a thermal decomposition temperature of 500° C. was Y in the peak, a relationship of 2X<Y was obtained with X:Y=30:70.

Using the obtained positive electrode, a nonaqueous electrolyte air battery was prepared in accordance with the same procedure as in Example 1, and cycle characteristics were evaluated. As a result, the cycle life was 300 cycles.

As described above, the positive electrode for a nonaqueous electrolyte air battery in the embodiment is excellent in cycle characteristics.

Comparative Example 2

A positive electrode was prepared by the same technique as that in Comparative Example 1 except that $Co_3O_4$ was used as a positive electrode catalyst. The catalyst layer of the prepared positive electrode was scraped off, and analysis was performed using a pyrolysis gas chromatograph mass spectrometer. As a result, peaks were present in an ion chromatogram with mass numbers of 132 and 200 at a thermal decomposition temperature of 475° C., and the peak with a mass number of 132 gave the largest area. Where a peak area at a thermal decomposition temperature of 450° C. was X and a peak area at a thermal decomposition temperature of 500° C. was Y in the peak, a relationship of 2X<Y was obtained with X:Y=30:70. Using the obtained positive electrode, a nonaqueous electrolyte air battery was prepared in accordance with the same procedure as in Example 1, and cycle characteristics were evaluated. As a result, the cycle life was 280 cycles.

Comparative Example 3

A positive electrode was prepared by the same technique as that in Comparative Example 1 except that $Fe_3O_4$ was used as a positive electrode catalyst. The catalyst layer of the prepared positive electrode was scraped off, and analysis was performed using a pyrolysis gas chromatograph mass spectrometer. As a result, peaks were present in an ion chromatogram with mass numbers of 132 and 200 at a thermal decomposition temperature of 475° C., and the peak with a mass number of 132 gave the largest area. Where a peak area at a thermal decomposition temperature of 450° C. was X and a peak area at a thermal decomposition temperature of 500° C. was Y in the peak, a relationship of 2X<Y was obtained with X:Y=30:70. Using the obtained positive electrode, a nonaqueous electrolyte air battery was prepared in accordance with the same procedure as in Example 1, and cycle characteristics were evaluated. As a result, the cycle life was 270 cycles.

Comparative Example 4

A positive electrode was prepared by the same technique as that in Comparative Example 1 except that CuO was used as a positive electrode catalyst. The catalyst layer of the prepared positive electrode was scraped off, and analysis was performed using a pyrolysis gas chromatograph mass spectrometer. As a result, peaks were present in an ion chromatogram with mass numbers of 132 and 200 at a thermal decomposition temperature of 475° C., and the peak with a mass number of 132 gave the largest area. Where a peak area at a thermal decomposition temperature of 450° C. was X and a peak area at a thermal decomposition temperature of 500° C. was Y in the peak, a relationship of 2X<Y was obtained with X:Y=30:70. Using the obtained positive electrode, a nonaqueous electrolyte air battery was prepared in accordance with the same procedure as in Example 1, and cycle characteristics were evaluated. As a result, the cycle life was 200 cycles.

Comparative Example 5

A positive electrode was prepared by the same technique as that in Comparative Example 1 except that NiO was used as a positive electrode catalyst. The catalyst layer of the prepared positive electrode was scraped off, and analysis was performed using a pyrolysis gas chromatograph mass spectrometer. As a result, peaks were present in an ion chromatogram with mass numbers of 132 and 200 at a thermal decomposition temperature of 475° C., and the peak with a mass number of 132 gave the largest area. Where a peak area at a thermal decomposition temperature of 450° C. was X and a peak area at a thermal decomposition temperature of 500° C. was Y in the peak, a relationship of 2X<Y was obtained with X:Y=25:75. Using the obtained positive electrode, a nonaqueous electrolyte air battery was prepared in accordance with the same procedure as in Example 1, and cycle characteristics were evaluated. As a result, the cycle life was 210 cycles.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A nonaqueous electrolyte air battery comprising:
a positive electrode;
a separator;
a negative electrode; and
an exterior member comprising holes for supplying oxygen to the positive electrode,
wherein the positive electrode comprises at least a catalyst which activates oxygen, a conductive material and a binder;
when a thermal decomposition starting temperature of the binder is T1° C. and a thermal decomposition ending temperature of the binder is T2° C., a signal with any of mass numbers of 81, 100, 132 and 200 is present in pyrolysis mass spectrometry of the binder in a range of T1° C. to T2° C.;

where a peak area at T1° C. is X and
a peak area at T2° C. is Y,
X and Y satisfy a relation of 2X≥Y;
the binder is a polymer containing fluorine;
the decomposition starting temperature of the binder is a temperature at which in a principal weight decrease process, a weight is decreased by 5% of a weight loss in the weight decrease process when the binder is analyzed by a thermogravimetric analyzer;
the thermal decomposition ending temperature of the binder is a temperature at which in a principal weight decrease process, a weight is decreased by 95% of a weight loss in the weight decrease process when the binder is analyzed by a thermogravimetric analyzer; and
the mass spectrum signal area is an area of a signal with a mass number at which the mass spectrum signal area from T1° C. to T2° C. is a maximum area among a plurality of signals selected in terms of mass numbers of 81, 100, 132 and 200 in a mass spectrum of the binder alone.

2. The air battery according to claim 1, wherein a raw material of the polymer containing fluorine comprises at least one selected from the group consisting of vinylidene difluoride, tetrafluoroethylene, chlorotrifluoroethylene, vinyl fluoride, ethylene, hexafluoropropene a tetrafluoroethylene copolymer, a polyvinylidene fluoride-hexafluoropropene copolymer and a polytetrafluoroethylene-hexafluoropropene copolymer.

3. The air battery according to claim 1, wherein the polymer comprises at least one selected from the group consisting of polyvinylidene fluoride, polytetrafluoroethylene, polychlorotrifluoroethylene, polyvinyl fluoride, ethylene, a tetrafluoroethylene copolymer, a polyvinylidene fluoride-hexafluoropropene copolymer and a polytetrafluoroethylene-hexafluoropropene copolymer.

4. The air battery according to claim 1, wherein the catalyst of the positive electrode comprises at least one metal selected from the group consisting of Au, Pt, Pd and Ag.

5. The air battery according to claim 1, wherein the catalyst of the positive electrode comprises an oxide comprising at least one metal selected from the group consisting of Ti, Zr, V, Nb, Ta, Cr, Mo, W, Mn, Fe, Sn, Co, Rh, Ir, Ni, Cu, Ag, In, Sn, La and Ce.

6. The air battery according to claim 1, wherein the catalyst of the positive electrode comprises at least one metal oxide selected from the group consisting of $Fe_2O_3$, $Fe_3O_4$, $Co_3O_4$, NiO, CuO, $CoFe_2O_4$ and $La_{0.8}Sr_{0.2}MnO_3$.

7. The air battery according to claim 1, wherein the catalyst of the positive electrode comprises a complex comprising a core metal selected from the group consisting of Fe, Ni and Co and comprising a plane tetradenate ligand selected from the group consisting of phthalocyanine, porphyrin and salen.

8. The air battery according to claim 1, wherein the negative electrode comprises at least one material selected from the group consisting of a metal oxide, a metal sulfide, a metal nitride, a lithium metal, a lithium alloy, a lithium composite oxide and a carbonaceous substance.

9. The air battery according to claim 1, wherein the metal oxide included in the negative electrode comprises at least one of tin oxide, silicon oxide, lithium titanium oxide, niobium oxide and tungsten oxide.

10. The air battery according to claim 1, wherein the metal sulfide included in the negative electrode comprises at least one of tin sulfide and titanium sulfide.

11. The air battery according to claim 1, wherein the metal nitride included in the negative electrode comprises at least one of lithium cobalt nitride, lithium iron nitride and lithium manganese nitride.

12. The air battery according to claim 1, wherein the lithium alloy included in the negative electrode comprises at least one of lithium aluminum alloy, lithium tin alloy, lithium lead alloy and lithium silicon alloy.

13. The air battery according to claim 1, wherein contents of the catalyst, the conductive material and the binder in the positive electrode are 1% by mass to 20% by mass for the catalyst, 1% by mass to 90% by mass for the conductive material and 1% by mass to 30% by mass for the binder.

14. The air battery according to claim 1, wherein the negative electrode comprises a binder, and the binder of the negative electrode comprises at least one selected from the group consisting of polytetrafluoroethylene, polyvinylidene fluoride, ethylene-propylene-butadiene rubber, styrene-butadiene rubber and carboxymethyl cellulose.

* * * * *